(12) United States Patent
Bullough

(10) Patent No.: US 10,445,203 B2
(45) Date of Patent: Oct. 15, 2019

(54) TESTING SYSTEMS THAT INCLUDE DIGITAL SIGNAL PROCESSING SYSTEMS

(71) Applicant: Sorenson IP Holdings, LLC, Salt Lake City, UT (US)

(72) Inventor: Jeffrey Bullough, South Jordan, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 183 days.

(21) Appl. No.: 15/643,356

(22) Filed: Jul. 6, 2017

(65) Prior Publication Data

US 2019/0012247 A1  Jan. 10, 2019

(51) Int. Cl.
- *G06F 11/00* (2006.01)
- *G06F 11/26* (2006.01)
- *G06F 11/22* (2006.01)

(52) U.S. Cl.
CPC .......... *G06F 11/26* (2013.01); *G06F 11/2236* (2013.01)

(58) Field of Classification Search
CPC ....................................................... G06F 11/26
USPC ................... 714/25, 30, 31, 32, 33, 37, 703
See application file for complete search history.

(56) References Cited

U.S. PATENT DOCUMENTS

| | | | | |
|---|---|---|---|---|
| 5,295,178 | A | * | 3/1994 | Nickel ...................... H03G 1/02 370/525 |
| 5,305,384 | A | * | 4/1994 | Ashby ...................... H04K 1/02 380/28 |
| 5,473,666 | A | | 12/1995 | Szczebak, Jr. et al. |
| 5,490,235 | A | | 2/1996 | Von Holten et al. |
| 6,215,854 | B1 | | 4/2001 | Walance |
| 9,020,011 | B1 | | 4/2015 | Hiebert et al. |
| 2011/0273197 | A1 | | 11/2011 | Banerjee et al. |
| 2015/0280844 | A1 | | 10/2015 | Yu et al. |

FOREIGN PATENT DOCUMENTS

| | | |
|---|---|---|
| CN | 103227686 A | 7/2013 |
| CN | 105553754 A | 5/2016 |
| KR | 20040105369 A | 12/2004 |
| WO | 2011088696 A1 | 7/2011 |

OTHER PUBLICATIONS

E. Wong et al., Digital signal processing of SINAD measurement for cordless telephone, School of Electrical and Electronic Engineering, May 1992, 5 pgs.

(Continued)

*Primary Examiner* — Dieu Minh T Le
(74) *Attorney, Agent, or Firm* — Maschoff Brennan

(57) ABSTRACT

According to one or more aspects of the present disclosure, operations may include activating testing software of a digital signal processing system instead of activating operating software of the digital signal processing system. The testing software may be configured to, while activated, perform linear operations with respect to signals that traverse the signal path. The operating software may be configured to, while activated, perform non-linear operations with respect to signals that traverse the signal path. The testing software may be activated during testing of one or more hardware elements of the signal path that are configured to perform analog operations on signals that traverse the signal path.

20 Claims, 6 Drawing Sheets

(56) References Cited

OTHER PUBLICATIONS

High quality DSP-software development and testing, Robotics, Intelligent Systems and Signal Processing, 2003. Proceedings. Oct. 2003 IEEE International Conference.

J. Helmschmidt et al., Reconfigurable signal processing in wireless terminals [mobile applications], Design, Automation and Test in Europe Conference and Exhibition, Mar. 2003.

* cited by examiner

TESTING SYSTEMS THAT INCLUDE DIGITAL SIGNAL PROCESSING SYSTEMS

FIELD

The embodiments discussed in the present disclosure are related to testing systems that include digital signal processing systems.

BACKGROUND

An electronic device may include one or more analog elements configured to perform analog operations on signals that traverse a signal path. Additionally, the electronic device may also include a digital signal processing (DSP) system configured to perform digital operations on signals that traverse the signal path. In some instances, the DSP system may interfere with testing of the analog elements.

The subject matter claimed in the present disclosure is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to testing a system that includes a digital signal processing system may be performed. In some embodiments, the operations may include activating testing software of a digital signal processing system instead of activating operating software of the digital signal processing system. The testing software may be configured to, while activated, perform linear operations with respect to signals that traverse the signal path. The operating software may be configured to, while activated, perform non-linear operations with respect to signals that traverse the signal path. The testing software may be activated during testing of one or more hardware elements of the signal path that are configured to perform analog operations on signals that traverse the signal path.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
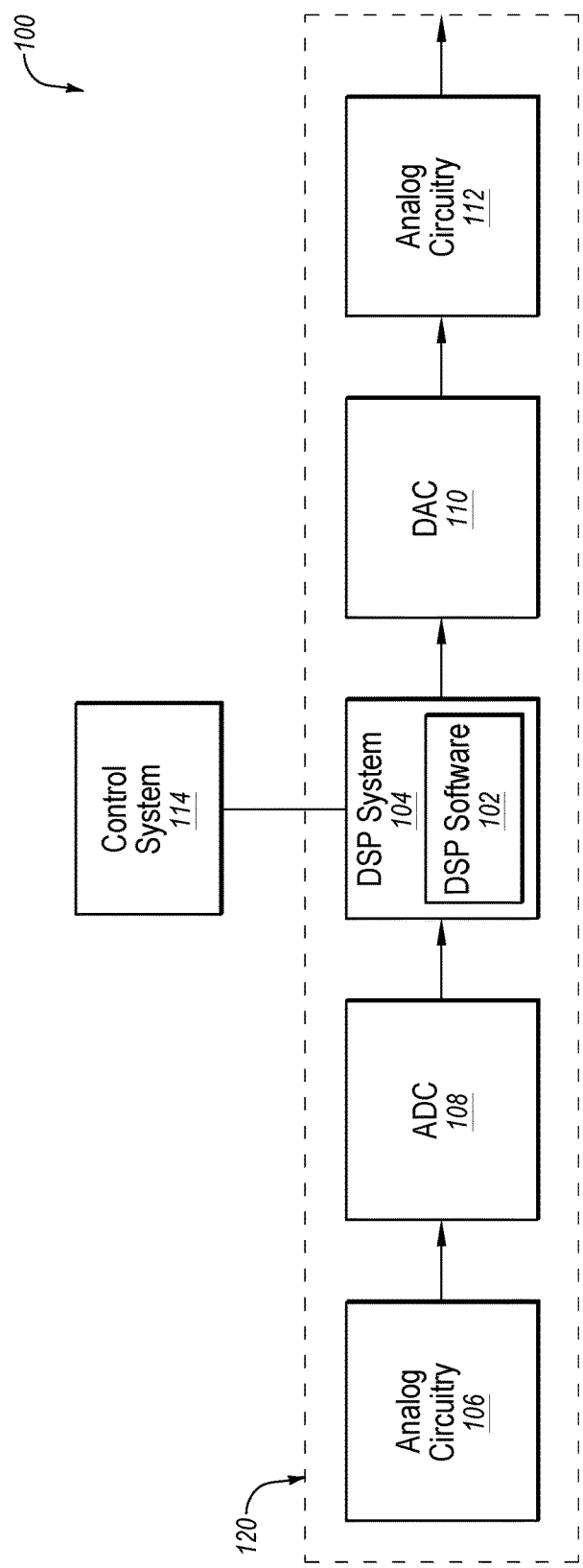
FIG. 1 illustrates an example system that may include a digital signal processing (DSP) system that may be configured to facilitate the testing of analog elements of the system.

Electronic devices may have different components configured to perform operations on signals that traverse signal paths of the electronic devices. The operations may include any manipulation of a signal that may cause a change in the signal. For example, the operations may include filtering, changing a frequency, changing an amplitude, changing a modulation, changing a polarity, etc.

In some instances, an electronic device may include components that may perform analog processing operations on signals and components that may perform digital processing operations on signals that traverse the same signal path. For example, in some embodiments, an electronic device may include one or more hardware elements that may be configured to perform analog processing operations (also referred to as "analog operations") with respect to signals that traverse a signal path. Additionally, the electronic device may include a digital signal processing (DSP) system configured to perform digital processing operations (also referred to as "digital operations") with respect to signals that traverse the signal path. In the present disclosure, reference to "analog operations" or "analog processing operations" may include any operation that is performed in an analog domain. Additionally, hardware elements that are configured to perform analog operations may be referred to as "analog elements." Moreover, reference to "digital operations" or "digital processing operations" may include any operation that is performed in a digital domain. Further, the hardware elements that are organized and configured to perform digital operations may be referred to as a digital signal processing system. In addition, reference to an element being part of or included in a signal path may refer to elements that are configured to perform operations on signals that traverse the signal path.

In some instances, a digital signal processing system of a signal path may interfere with the testing of analog elements of the signal path. For example, in some instances a DSP system may perform non-linear operations (e.g., Automatic Gain Control (AGC), compression, echo cancellation, range limiting, etc.) with respect to signals that traverse a signal path, which may produce varying output for a given signal. For instance, during testing, the output of the DSP system may be dependent on one or more prior inputs that may be unknown as well as on a current test input. As a result, the output of the DSP system may not be predictable based on the current test input. The unpredictable output may make it difficult to determine if other hardware elements (e.g., analog elements) that are included in the signal path are performing as designed because the output generated by the DSP system may not always be consistent with the same input test signal over multiple iterations of testing.

According to one or more embodiments of the present disclosure, a testing procedure may be performed in a manner to reduce problems that may be caused by a DSP system with respect to the testing of analog elements. For example, in some embodiments, the DSP system may have DSP software that is configured to direct the digital operations that may be performed on the signals that traverse a signal path. In some embodiments, the DSP software may include testing software that may be activated during the testing of analog elements of the signal path. The testing software may be configured to perform linear operations with respect to signals that traverse the signal path such that the output generated by the DSP system may be predictable and consistent. The output being predictable and consistent may allow for changes that are made to test signals to be identified as resulting from digital operations or analog operations.

Additionally, the DSP software may include operating software that is configured to perform non-linear operations on the signals that traverse the signal path. The non-linear operations may be those operations that the DSP may perform during operation of the DSP system and the associated electronic device in their intended and designed manner but that also may make the testing of the analog elements difficult. In some embodiments, during testing of the analog elements, the testing software may be activated instead of the operating software to help improve the testing of the analog elements. Additionally or alternatively, in response to the testing of the analog elements being completed, the operating software may be activated instead of the testing software. The changing between testing software and operating software may improve the testing of analog elements while also allowing the DSP system to be configured to perform non-linear operations upon the shipping or use of the DSP system or electronic device that includes the DSP system.

In some embodiments, the electronic device may include more than one signal path in which echo and cross-talk between signal paths may also affect the testing of elements. In these or other embodiments, a signal path that does not include elements being currently tested may be muted during testing of another signal path. For example, in some instances, during testing of elements of first signal path, a second signal path may be muted. In some embodiments, the muting may null signals that traverse the second signal path to reduce or eliminate any cross-talk or echo that may be caused by the second signal path. In these or other embodiments, the muting may be accomplished via muting software that may be activated in a DSP system configured to perform operations on signals that traverse the second signal path. Additionally or alternatively, the muting software may be activated while testing software of a DSP system configured to perform operations on signals that traverse the first signal path is activated instead of operating software of the DSP system. In some embodiments, the DSP system configured to perform operations on signals that traverse the first signal path may be the same as the DSP system configured to perform operations on signals that traverse the second signal path. Additionally or alternatively, the DSP system configured to perform operations on signals that traverse the first signal path may be different from the DSP system configured to perform operations on signals that traverse the second signal path.

Turning to the figures, FIG. 1 illustrates an example system 100 that may include a DSP system 104 that may be configured to facilitate the testing of analog elements of the system 100. The system 100 may be arranged in accordance with at least one embodiment described in the present disclosure.

In some embodiments, the system 100 may be included in an electronic device. The electronic device may include a desktop computer, a laptop computer, a smartphone, a mobile phone, a tablet computer, a telephone, a phone console, a server, a sound system, a television, or any other electronic device. In some embodiments, the system 100 may include a signal path 120 that may include analog circuitry 106, an analog to digital converter (ADC) 108, the DSP system 104, a digital to analog converter (DAC) 110, and analog circuitry 112. Additionally or alternatively, the system 100 may include a control system 114.

Signals that traverse the signal path 120 may include any sort of signal that may represent or carry information. For example, the signals may include data signals, audio signals, video signals, control signals, etc. Additionally, as indicated below, the signals may be analog signals, digital signals, or a combination of analog and digital signals.

The analog circuitry 106 and 112 may include any suitable analog elements that may be configured to perform analog operations on signals that may traverse the signal path 120. For example, the analog circuitry 106 and 112 may include transistors, resistors, capacitors, inductors, etc., that may be arranged and configured to perform the analog operations on the signals that may traverse the signal path. The signals that may be received and output by the analog circuitry 106 and 112 may be analog signals.

The ADC 108 may be configured to receive analog signals that may be output by the analog circuitry 106. The ADC 108 may include any suitable system, apparatus, or device that may be configured to convert the analog signals to digital signals.

The DSP system 104 may be configured to receive the digital signals that may be generated by the ADC 108. The DSP system 104 may include any suitable system, apparatus, or device that may be configured to perform operations on the received digital signals. For example, the DSP system 104 may include a computing system such as described below with respect to FIG. 4 that is configured to perform operations on the received digital signals.

In some embodiments, the DSP system 104 may include DSP software 102 configured to direct the operations of the DSP system 104. In some embodiments, the DSP software 102 may include testing software. In some embodiments, the testing software may be configured to perform testing operations on the digital signals that may help improve the testing of one or more analog elements (e.g., the analog circuitry 106 and/or 112) of the system 100. For example, the testing software may be configured to perform linear operations on the digital signals such that the output of the DSP system 104 may be accurately and consistently predicted based on test input signals. In the present disclosure, reference to software performing operations on signals may include operations that the software directs performance of with respect to the signals.

Additionally or alternatively, the DSP software 102 may include operating software that may be configured to perform operating operations on the digital signals. The operating operations may be operations that the DSP system 104 may perform during its designed for and intended use. In some embodiments, testing of the analog elements with the operating software activated may be difficult. For example, the operating software may be configured to perform non-linear operations on the digital signals, which as described above, may make the testing of analog elements difficult.

The DAC 110 may be configured to receive digital signals that may be output by the DSP system 104. The DAC 110 may include any suitable system, apparatus, or device that may be configured to convert the digital signals to analog signals. In some embodiments, the analog circuitry 112 may be configured to receive the analog signals that are output by the DAC 110.

The control system 114 may include any suitable system, apparatus, or device, configured to control operations of the DSP system 104. By way of example, in some embodiments, the control system 114 may include a computing system such as that described below with respect to FIG. 4. Additionally or alternatively, although depicted as being separate from the DSP system 104, the control system 114 may be included in and part of the DSP system 104 in some embodiments.

The control system 114 may be configured to direct the activation of testing software and operating software of the DSP software 102 in some embodiments. For example, in some embodiments, the control system 114 may be configured to activate the testing software instead of the operating software during the testing of one or more analog elements of the signal path 120.

In some embodiments, the control system 114 may be configured to activate the testing software instead of the operating software by configuring the DSP system 104 such that the testing software performs operations with respect to the signals received by the DSP system 104 and the operating software does not perform operations with respect to the signals received by the DSP system 104. For example, in some embodiments, both the testing software and the operating software may be included in the DSP software 102. In these or other embodiments, the control system 114 may be configured to generate a command that causes the testing software to be loaded or otherwise executed instead of the operating software. In some embodiments, the command may be generated in response to a user input.

Additionally or alternatively, the operating software may be replaced with the testing software such that the DSP software 102 may include only the testing software and not the operating software. In these or other embodiments, the control system 114 may be configured to load or otherwise execute the DSP software 102 in general such that the control system 114 may activate the testing software instead of the operating software given that the operating software may not be available for loading or execution.

In these or other embodiments, the control system 114 may be configured to determine that the testing of the one or more analog elements has begun or is about to begin and to activate the testing software in response to the determination. In some embodiments, the control system 114 may be configured to make the determination in response to a user input indicating that the testing has begun or is about to begin. In these or other embodiments, the control system 114 may be configured to identify that test signals are being received by the DSP system 104. In these or other embodiments, the control system 114 may be configured to determine that the testing has begun in response to identifying that one or more test signals have been received by the DSP system 104.

In these or other embodiments, the control system 114 may be configured to activate the operating software instead of the testing software in response to the testing of one or more analog elements of the system 100 finishing. In these or other embodiments, the operating software may be activated instead of the testing software in preparation for the shipping or designed for use of the system 100.

In these or other embodiments, the control system 114 may be configured to activate the operating software instead of the testing software by configuring the DSP system 104 such that the operating software performs operations with respect to the digital signals and the testing software does not perform operations with respect to the digital signals. For example, in some embodiments, both the testing software and the operating software may be included in the DSP software 102. In these or other embodiments, the control system 114 may be configured to generate a command that causes the operating software to be loaded or otherwise executed instead of the testing software. In some embodiments, the command may be generated in response to a user input.

Additionally or alternatively, the testing software may be replaced with the operating software such that the DSP software 102 may include only the operating software and not the testing software. In these or other embodiments, the control system 114 may be configured to load or otherwise execute the DSP software 102 in general such that the control system 114 may activate the operating software instead of the testing software given that the testing software may not be available for loading or execution.

In these or other embodiments, the control system 114 may be configured to determine that the testing of the one or more analog elements has finished and to activate the operating software in response to the determination. In some embodiments, the control system 114 may be configured to make the determination in response to a user input indicating that the testing has finished. In these or other embodiments, the control system 114 may be configured to identify that test signals are being received by the DSP system 104 and to identify when test signals are no longer being received by the DSP system 104. In these or other embodiments, the control system 114 may be configured to determine that the testing has finished in response identifying when test signals are no longer being received by the DSP system 104.

Modifications, additions, or omissions may be made to the system 100 without departing from the scope of the present disclosure. For example, the system 100 may include additional or fewer elements than those specifically listed. For instance, in some embodiments, the system 100 may not include the analog circuitry 106 and the ADC 108, or the analog circuitry 112 and the DAC 110. Additionally, as indicated above, the system 100 may be included in any suitable electronic device that may be built or shipped as a user device. As such, the operations described with respect to changing between testing software and operating software may be performed to help with the finalizing of products that may be used as user devices.

Figure 2:
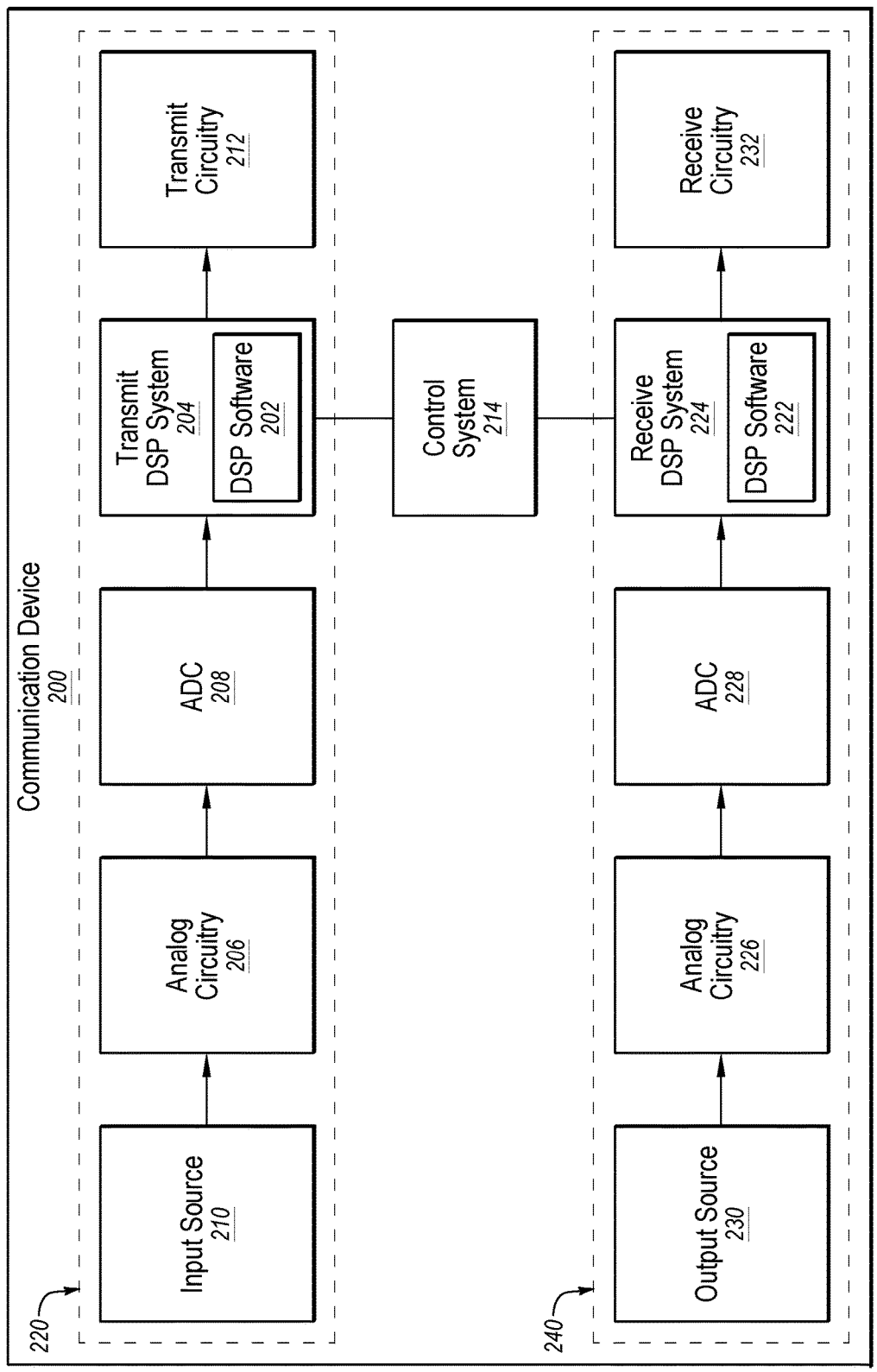
FIG. 2 illustrates an example communication device that may include one or more DSP systems that may be configured to facilitate the testing of elements of the communication device.

FIG. 2 illustrates an example communication device 200 that may include one or more DSP systems that may be configured to facilitate the testing of elements of the communication device 200. The communication device 200 may be arranged in accordance with at least one embodiment described in the present disclosure.

The communication device 200 may include any suitable system, apparatus, or device that may be configured to conduct a communication session with another communication device. A communication session may be a plain old telephone service (POTS) call, a VoIP telephone call, a cellular telephone call, an audiovisual communication session or other communication session or combination thereof. In these or other embodiments, the communication device 200 may be a transcription telephone, such as a captioning telephone, that is configured to present transcriptions of the communication session to a hearing impaired user, such as one of the CaptionCall® 57T model family or 67T model family of captioning telephones or a device running the CaptionCall® mobile app.

In some embodiments, the communication device 200 may include a transmit signal path 220 that may include an input source 210, analog circuitry 206, an analog to digital converter (ADC) 208, a transmit DSP system 204 and transmit circuitry 212.

In some embodiments, the input source 210 may include any suitable system, apparatus, or device that may be configured to obtain signals that may be used and transmitted in a communication session. For example, the input source 210 may include a microphone and other components configured to capture audio that may be spoken by a participant in the communication session and configured to generate a corresponding audio signal. Additionally or alternatively, the input source 210 may include a video camera configured to capture video of the participant and generate a corresponding video signal that may be transmitted as part of the communication session. In some embodiments, the signals that may be generated by the input source 210 may be analog signals.

The analog circuitry 206 may include any suitable analog elements that may be configured to perform analog operations on signals that may be generated by the input source 210. For example, the analog circuitry 206 may be configured to perform filtering or gain operations with respect to the analog signals.

The ADC 208 may be configured to receive analog signals that may be output by the analog circuitry 206. The ADC 208 may include any suitable system, apparatus, or device that may be configured to convert the analog signals to digital signals.

The transmit DSP system 204 may be configured to receive the digital signals that may be output by the ADC 208. The transmit DSP system 204 may include any suitable system, apparatus, or device that may be configured to perform operations on the digital signals. For example, the transmit DSP system 204 may include a computing system such as described below with respect to FIG. 4 that is configured to perform operations on the digital signals.

In some embodiments, the transmit DSP system 204 may include DSP software 202 configured to direct the operations of the transmit DSP system 204. In some embodiments, the DSP software 202 may include first testing software configured to help with the testing of one or more analog elements of the transmit signal path 220. In these or other embodiments, the first testing software may be configured similar to the testing software described above with respect to FIG. 1. Additionally or alternatively, the DSP software 202 may include first operating software configured to perform operating operations with respect to signals that traverse the transmit signal path 220. In these or other embodiments, the first operating software may be configured similar to the operating software described above with respect to FIG. 1.

Additionally or alternatively, in some embodiments, the DSP software 202 may include first muting software. The first muting software may be configured to null signals that may be received at the transmit DSP system 204. In some embodiments, the nulling of the signals may include generating a null output signal or no output signal regardless of what signals may or may not be received by the transmit DSP system 204.

The transmit circuitry 212 may be configured to receive digital signals that may be output by the DSP system 204. The transmit circuitry 212 may include any suitable system, apparatus, or device configured to transmit the signals related to the communication session. For example, in some embodiments, the transmit circuitry 212 may include a DAC configured to convert the digital signals generated by the transmit DSP system 204 to analog signals. In these or other embodiments, the transmit circuitry 212 may include analog circuitry configured to perform operations on the analog signals. Additionally or alternatively, the transmit circuitry 212 may include radio frequency transmitting circuitry configured to transmit the corresponding analog signals via radio waves.

In these or other embodiments, the transmit circuitry 212 may be configured to maintain the digital signals as digital signals and to communicate the digital signals. For example, the digital signals may be communicated as a VoIP communication signal, a digital audiovisual communication signal, a digital audio signal, a digital video signal, or the like.

In some embodiments, the communication device 200 may include a receive signal path 240 that may include receive circuitry 232, a receive DSP system 224, a DAC 228, analog circuitry 226, and an output source 230. The receive circuitry 232 may be configured to receive signals that may be related to a communication session, such as signals derived from the other communication device that may be participating in the communication session. The receive circuitry 232 may include any suitable system, apparatus, or device configured to receive the signals related to the communication session. For example, in some embodiments, the receive circuitry 232 may include radio frequency receiving circuitry configured to receive the corresponding signals via radio waves. Additionally or alternatively, the receive circuitry 232 may be configured to receive signals such as a VoIP communication signal, an audiovisual communication signal, an audio signal, a video signal, or the like.

In some embodiments, the signals received by the receive circuitry 232 may be digital signals. Additionally or alternatively, the signals received by the receive circuitry 232 may be analog signals. In these or other embodiments, the receive circuitry 232 may include analog circuitry configured to perform operations on the received analog signals. Additionally or alternatively, the receive circuitry 232 may include an ADC configured to convert the analog signals to digital signals.

The receive DSP system 224 may be configured to receive digital signals that may be output by the receive circuitry 232. The receive DSP system 224 may include any suitable system, apparatus, or device that may be configured to perform operations on the digital signals. For example, the receive DSP system 224 may include a computing system such as described below with respect to FIG. 4 that is configured to perform operations on the digital signals.

In some embodiments, the receive DSP system 224 may include DSP software 222 configured to direct the operations of the receive DSP system 224. In some embodiments, the DSP software 222 may include second testing software configured to help with the testing of one or more analog elements of the receive signal path 240. In these or other embodiments, the second testing software may be configured similar to the testing software described above with respect to FIG. 1. Additionally or alternatively, the DSP software 222 may include second operating software configured to perform operating functions with respect to signals that traverse the receive signal path 240. In these or other embodiments, the second operating software may be configured similar to the operating software described above with respect to FIG. 1.

Additionally or alternatively, in some embodiments, the DSP software 222 may include second muting software. The second muting software may be configured to null signals that may be received at the receive DSP system 224. In some embodiments, the nulling of the signals may include generating a null output signal or no output signal regardless of what signals may or may not be received by the receive DSP system 224.

In some embodiments, the DAC 228 may be configured to receive digital signals that may be output by the receive DSP system 224. The DAC 228 may include any suitable system, apparatus, or device that may be configured to convert the digital signals to analog signals.

The analog circuitry 226 may include any suitable analog elements that may be configured to perform analog operations on signals that may be output by the DAC 228. For example, the analog circuitry 226 may be configured to perform filtering or gain operations with respect to the analog signals.

The output source 230 may include any suitable system, apparatus, or device that may be configured to generate a communication session output based on signals that may be output by the analog circuitry 226. For example, the output source 230 may include a speaker configured to output audio of the communication session based on the signals output by the analog circuitry 226. In these or other embodiments, the output source 230 may include a display configured to present video or text transcriptions that may correspond to the communication session.

The control system 214 may include any suitable system, apparatus, or device, configured to control operations of the transmit DSP system 204 or the receive DSP system 224. By way of example, in some embodiments, the control system 214 may include a computing system such as that described below with respect to FIG. 4. Additionally or alternatively, although depicted as being separate from the transmit DSP system 204 and the receive DSP system 224, the control system 214 may be included in and part of the transmit DSP system 204 or the receive DSP system 224 in some embodiments. Further, in some embodiments, the communication device 200 may include a separate control system 214 for each of the transmit DSP system 204 and the receive DSP system 224.

The control system 214 may be configured to direct the activation of the testing software, the operating software, and the muting software of the transmit DSP system 204 and the receive DSP system 224. For example, in some embodiments, the control system 214 may be configured to activate the first testing software instead of the first operating software during the testing of one or more analog elements of the transmit signal path 220. Additionally or alternatively, the control system 214 may be configured to activate the second testing software instead of the second operating software during the testing of one or more analog elements of the receive signal path 240. In some embodiments, the control system 214 may be configured to activate the first testing software instead of the first operating software or to activate the second testing software instead of the second operating software such as described above with respect to FIG. 1.

In these or other embodiments, the control system 214 may be configured to activate the first operating software instead of the first testing software in response to the testing of one or more analog elements of the transmit signal path 220 finishing. Additionally or alternatively, the control system 214 may be configured to activate the second operating software instead of the second testing software in response to the testing of one or more analog elements of the receive signal path 240 finishing. In some embodiments, the control system 214 may be configured to activate the first operating software instead of the first testing software or to activate the second operating software instead of the second testing software such as described above with respect to FIG. 1.

In these or other embodiments, the control system 214 may be configured to activate the second muting software of the DSP software 222 during testing of one or more elements of the transmit signal path 220. In some embodiments, the second muting software may be activated during the testing of one or more analog elements of the transmit signal path 220 such that the second muting software may be activated while the first testing software is activated. Additionally or alternatively, the control system 214 may be configured to activate the second muting software instead of the second testing software or the second operating software during the testing of the one or more elements of the transmit signal path 220. The activation of the second muting software may be such that echo or crosstalk from the receive signal path 240 that may occur along the transmit signal path 220 may be reduced or eliminated during the testing of elements of the transmit signal path 220. In these or other embodiments, the control system 214 may be configured to activate the second muting software instead of the second testing software or the second operating software in any suitable manner such as described above with respect to activating testing software instead of operating software or vice versa as described above with respect to FIG. 1.

Additionally or alternatively, in response to the testing of the one or more elements of the transmit signal path 220 finishing, the control system 214 may be configured to activate the second operating software or the second testing software. For example, one or more analog elements of the receive signal path 240 may not yet have been tested. In some of these instances, in response to finishing the testing of the one or more elements of the transmit signal path 220, the control system 214 may activate the second testing software instead of the second muting software or the second operating software. In these or other embodiments, the control system 214 may activate the second operating software instead of the second muting software or the second testing software in response to testing finishing or in preparation for shipping or use of the communication device 200.

The control system 214 may be similarly configured to activate the first muting software of the DSP software 202 during the testing of one or more elements of the receive signal path 240. In these or other embodiments, the control system 214 may be configured to activate the first testing software or the first operating software in response to the testing of the one or more elements of the receive signal path 240 finishing.

Modifications, additions, or omissions may be made to the communication device 200 without departing from the scope of the present disclosure. For example, the communication device 200 may include additional or fewer elements than those specifically listed. Additionally, the depicted elements may be configured differently than illustrated. For example, in some embodiments, the transmit DSP system 204 and the receive DSP system 224 may be a same DSP system. Additionally or alternatively, the DSP software 202 and the DSP software 222 may be the same software or include the same software. For example, in some embodiments, the first muting software may be the same as the second muting software, the first testing software may be the same as the second testing software, or the first operating software may be the same as the second operating software. Additionally, the specific configurations and arrangement of elements may vary. For example, the configuration and arrangement of elements included in the transmit signal path 220 and the receive signal path 240 may vary depending on the particular implementation.

Figure 3:
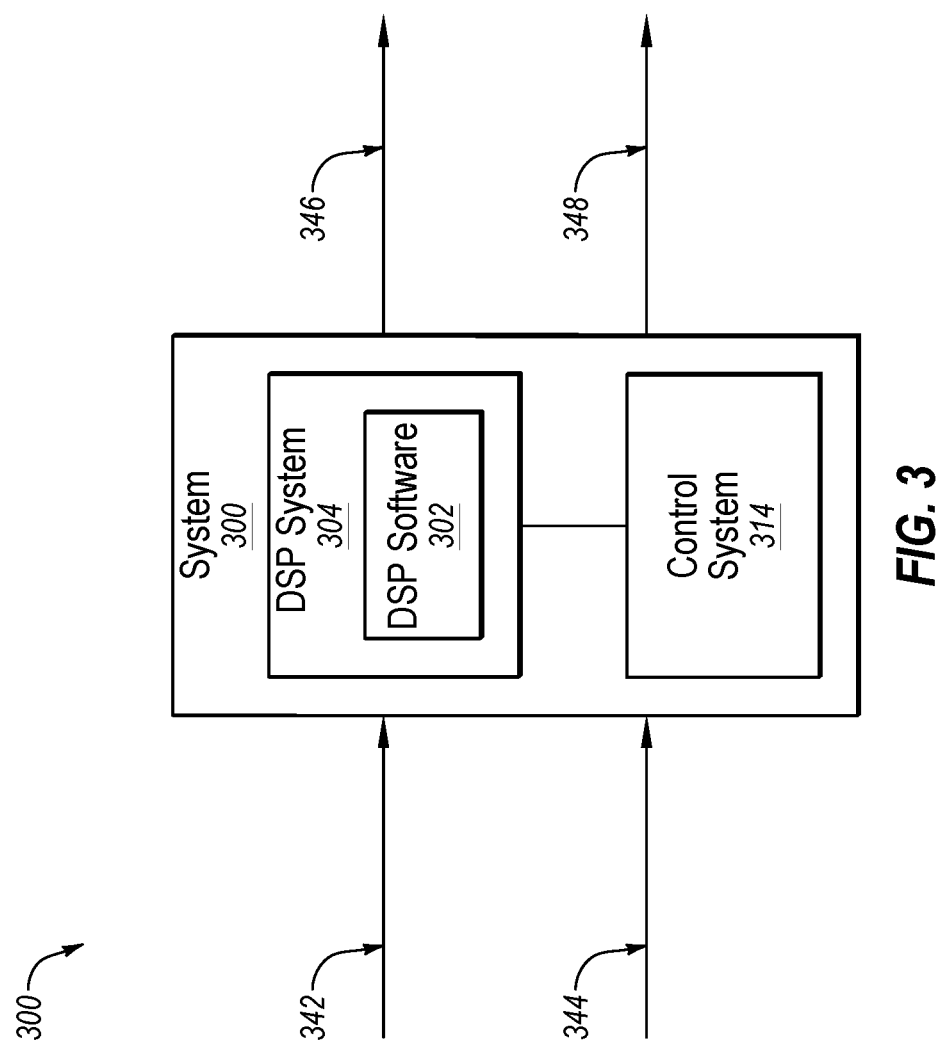
FIG. 3 illustrates an example system that may include one or more DSP systems configured to facilitate the testing of multiple signal paths.

FIG. 3 illustrates an example system 300 that may include one or more DSP systems configured to facilitate the testing of multiple signal paths. The system 300 may be arranged in accordance with at least one embodiment described in the present disclosure.

In some embodiments, the system 300 may be included in an electronic device. The electronic device may include a desktop computer, a laptop computer, a smartphone, a mobile phone, a tablet computer, a telephone, a phone console, a server, a sound system, a television, or any other electronic device.

In some embodiments, the system 300 may include an input 342, an input 344, an output 346, and an output 348.

The system 300 may be configured to direct signals received at the input 342 to the output 346 or to the output 348. Similarly, the system 300 may be configured to direct signals received at the input 344 to the output 346 or to the output 348. In some embodiments, the system 300 may be configured to direct the signals from a certain input to a certain output based on one or more control signals.

The directing of the signals from different inputs to different outputs may be such that the system 300 may include multiple signal paths. For example, the system 300 may include: a first signal path that may be between the input 342 and the output 346; a second signal path that may be between the input 342 and the output 348; a third signal path that may be between the input 344 and the output 346; and a fourth signal path that may be between the input 344 and the output 348.

In some embodiments, the first signal path may include one or more analog elements, the second signal path may include one or more analog elements, the third signal path may include one or more analog elements, or the fourth signal path may include one or more analog elements. In these or other embodiments, one or more of the first signal path, the second signal path, the third signal path, and the fourth signal path may not include any analog elements.

The system 300 may also include a DSP system 304. The DSP system 304 may be configured to perform operations on signals that traverse the first signal path, the second signal path, the third signal path, or the fourth signal path. The DSP system 304 may include any suitable system, apparatus, or device that may be configured to perform operations on the signals. For example, the DSP system 304 may include a computing system such as described below with respect to FIG. 4 that is configured to perform operations on the received signals.

In some embodiments, the DSP system 304 may include DSP software 302 configured to direct the operations of the DSP system 304. In some embodiments, the DSP software 302 may be configured such that different operations may be performed on the signals that traverse the different signal paths.

For example, the DSP software 302 may include: first operating software that may be configured to direct the operations on signals that traverse the first signal path; second operating software that may be configured to direct the operations on signals that traverse the second signal path; third operating software that may be configured to direct the operations on signals that traverse the third signal path; and fourth operating software that may be configured to direct the operations on signals that traverse the fourth signal path. The first operating software, second operating software, third operating software, and fourth operating software may be configured similar to the operating software described above with respect to FIG. 1.

In some embodiments, the DSP software 302 may include testing software that may be configured to help with the testing of analog elements that may be included in the first signal path, the second signal path, the third signal path, or the fourth signal path. For example, the DSP software 302 may include first testing software for the first signal path, second testing software for the second signal path, third testing software for the third signal path, or fourth testing software for the fourth signal path. In some embodiments, two or more of the first testing software, the second testing software, the third testing software, and the fourth testing software may be the same testing software. Additionally or alternatively, each of the first testing software, the second testing software, the third testing software, and the fourth testing software may be different and specifically configured for their respective signal path. The first testing software, the second testing software, the third testing software, and the fourth testing software may be configured similar to the testing software described above with respect to FIG. 1.

Additionally or alternatively, the DSP software 302 may include muting software that may be configured to help with the testing of the different signal paths. For example, the DSP software 302 may include first muting software for the first signal path, second muting software for the second signal path, third muting software for the third signal path, or fourth muting software for the fourth signal path. In some embodiments, two or more of the first muting software, the muting testing software, the third muting software, and the fourth muting software may be the same muting software. Additionally or alternatively, each of the first muting software, the second muting software, the third muting software, and the fourth muting software may be different and specifically configured for their respective signal path. The first muting software, the muting testing software, the muting testing software, and the fourth muting software may be configured similar to the muting software described above with respect to FIG. 2.

The system 300 may include a control system 314 in some embodiments. The control system 314 may include any suitable system, apparatus, or device, configured to control operations of the DSP system 304. By way of example, in some embodiments, the control system 314 may include a computing system such as that described below with respect to FIG. 4. Additionally or alternatively, although depicted as being separate from the DSP system 304, the control system 314 may be included in and part of the DSP system 304.

The control system 314 may be configured to direct the activation of the testing software, the operating software, and the muting software of the DSP system 304. For example, in some embodiments, the control system 314 may be configured to activate one or more of the second muting software, the third muting software, and the fourth muting software during the testing of one or more elements of the first signal path. Similarly, the control system 314 may be configured to activate one or more of the first muting software, the third muting software, and the fourth muting software during the testing of one or more elements of the second signal path. Additionally, the control system 314 may be configured to activate one or more of the first muting software, the second muting software, and the fourth muting software during the testing of one or more elements of the third signal path. In these or other embodiments, the control system 314 may be configured to activate one or more of the first muting software, the second muting software, and the third muting software during the testing of one or more elements of the fourth signal path. The control system 314 may be configured to activate the first muting software, the second muting software, the third muting software, or the fourth muting software similar to as described above with respect to activating muting software with respect to FIG. 2.

In these or other embodiments, the control system 314 may be configured to: activate the first testing software during the testing of one or more analog elements of the first signal path; activate the second testing software during the testing of one or more analog elements of the second signal path; activate the third testing software during the testing of one or more analog elements of the third signal path; or activate the fourth testing software during the testing of one or more analog elements of the fourth signal path. The control system 314 may be configured to activate the first testing software, the second testing software, the third testing software, or the fourth testing software similar to as described above with respect to activating testing software with respect to FIG. 1.

Additionally or alternatively, the control system 314 may be configured to: activate the first operating software, the second operating software, the third operating software, or the fourth operating software in response to finishing testing of the respective signal path. In these or other embodiments, the control system 314 may be configured to: activate the first operating software, the second operating software, the third operating software, or the fourth operating software prior to or in preparation of shipping or use of the system 300. The control system 314 may be configured to activate the first operating software, the second operating software, the third operating software, or the fourth operating software similar to as described above with respect to activating operating software with respect to FIG. 1.

Modifications, additions, or omissions may be made to the system 300 without departing from the scope of the present disclosure. For example, the system 300 may include additional or fewer elements than those specifically listed. Additionally, the depicted elements may be configured differently than illustrated. For example, in some embodiments, the system 300 may include more than one DSP system. For instance, the system 300 may include a separate DSP system for each signal path. Additionally or alternatively, the principles described above with respect to FIG. 3 are not limited to systems with four signal paths from two different inputs and two different outputs, but are applicable to systems with any number of signal paths, inputs, or outputs.

Figure 4:
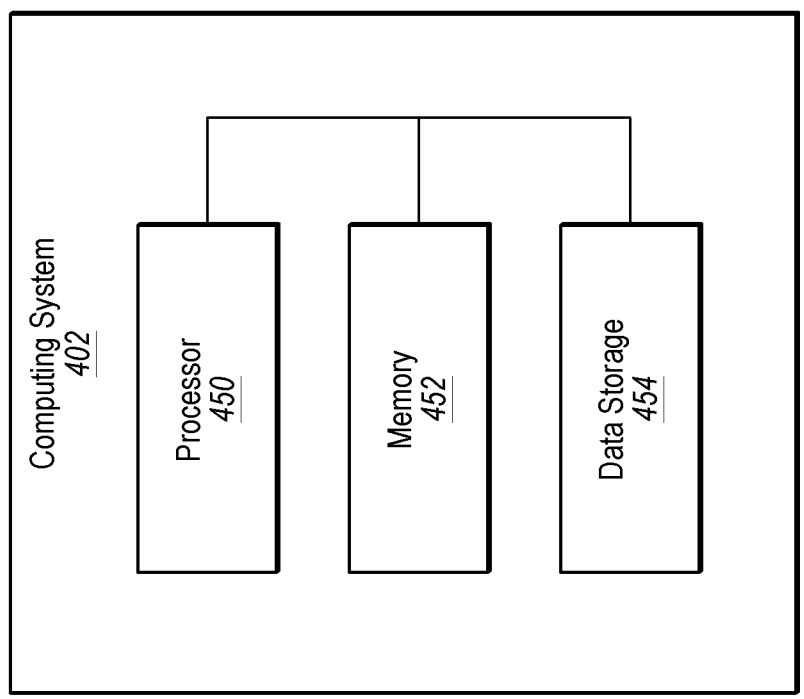
FIG. 4 illustrates a block diagram of an example computing system.

FIG. 4 illustrates a block diagram of an example computing system 402. The computing system 402 may be configured according to at least one embodiment of the present disclosure and may be configured to perform one or more operations related to testing systems that include DSP systems. One or more variations of the computing system 402 may be included in the DSP systems 104, 204, 224, and 304 and/or the control systems 114, 214, and 314 of FIGS. 1, 2, and 3. The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into the memory 452, the processor 450 may execute the program instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Figure 5:
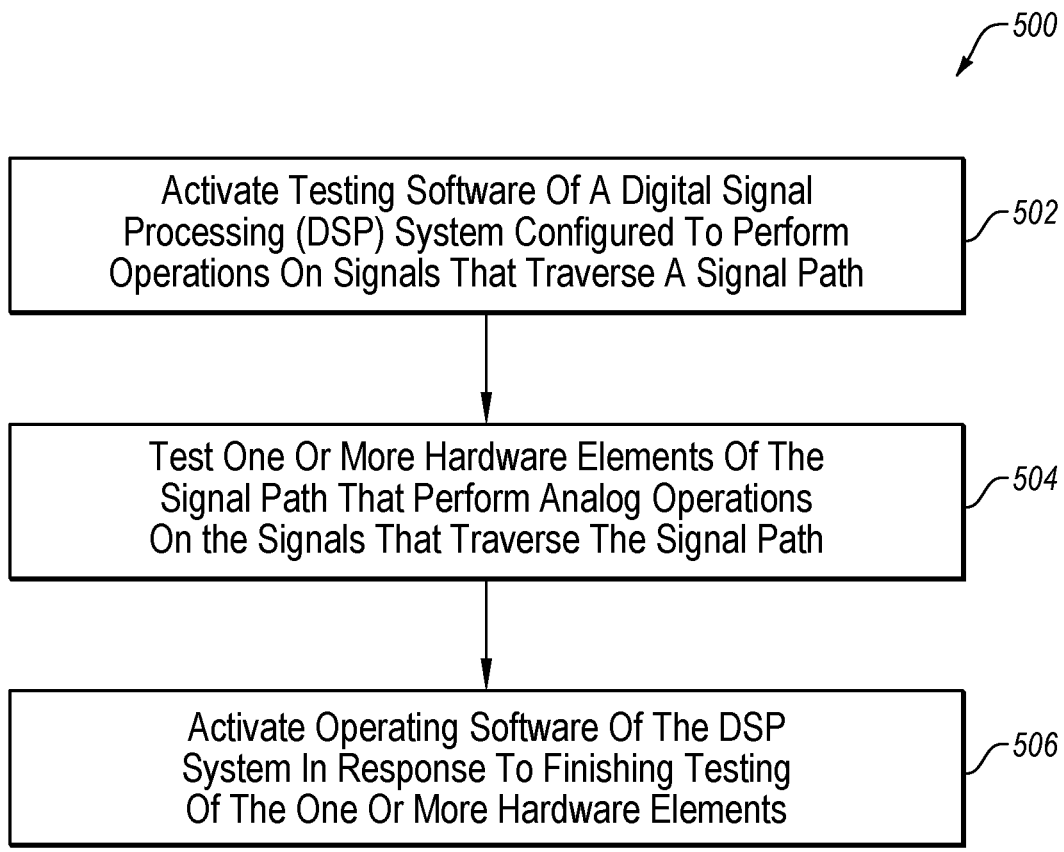
FIG. 5 is a flowchart of an example method to perform testing of analog elements of a system.

FIG. 5 is a flowchart of an example method 500 to perform testing of analog elements of a system. The method 500 may be arranged in accordance with at least one embodiment described in the present disclosure. The method 500 may be implemented, in some embodiments, by the system 100, the communication device 200, or the system 300 of FIGS. 1, 2, and 3. In some embodiments, the method 500 may result from operations performed by a system based on instructions stored in one or more computer-readable media. Although illustrated as discrete blocks, various blocks may be divided into additional blocks, combined into fewer blocks, or eliminated, depending on the particular implementation.

The method 500 may begin at block 502 where testing software of a DSP system may be activated. The testing software may be activated instead of operating software of the DSP system. The DSP system may be configured to perform operations on signals that traverse a signal path. In some embodiments, the testing software may be similar or analogous to the testing software described above with respect to FIG. 1 and the operating software may be similar or analogous to the operating software described above with respect to FIG. 1. Additionally or alternatively, the testing software may be activated instead of the operating software in a similar or analogous manner described above with respect to FIG. 1.

At block 504, one or more hardware elements may be tested while the testing software is activated. The one or more hardware elements may be configured to perform analog operations on signals that traverse the signal path in some embodiments.

At block 506, the operating software of the DSP system may be activated instead of the testing software. In some embodiments, the operating software may be activated in response to the testing of the one or more hardware elements finishing. Additionally or alternatively, the operating software may be activated in response to a determination being made that the testing has finished. In some embodiments, the determination may be made as described above with respect to FIG. 1. In these or other embodiments, the operating software may be activated in preparation for shipping or use of a system that includes the signal path.

Modifications, additions, or omissions may be made to method 500 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the method 500 may include operations related to the muting of another signal path during the testing of the hardware elements of the signal path.

Figure 6:
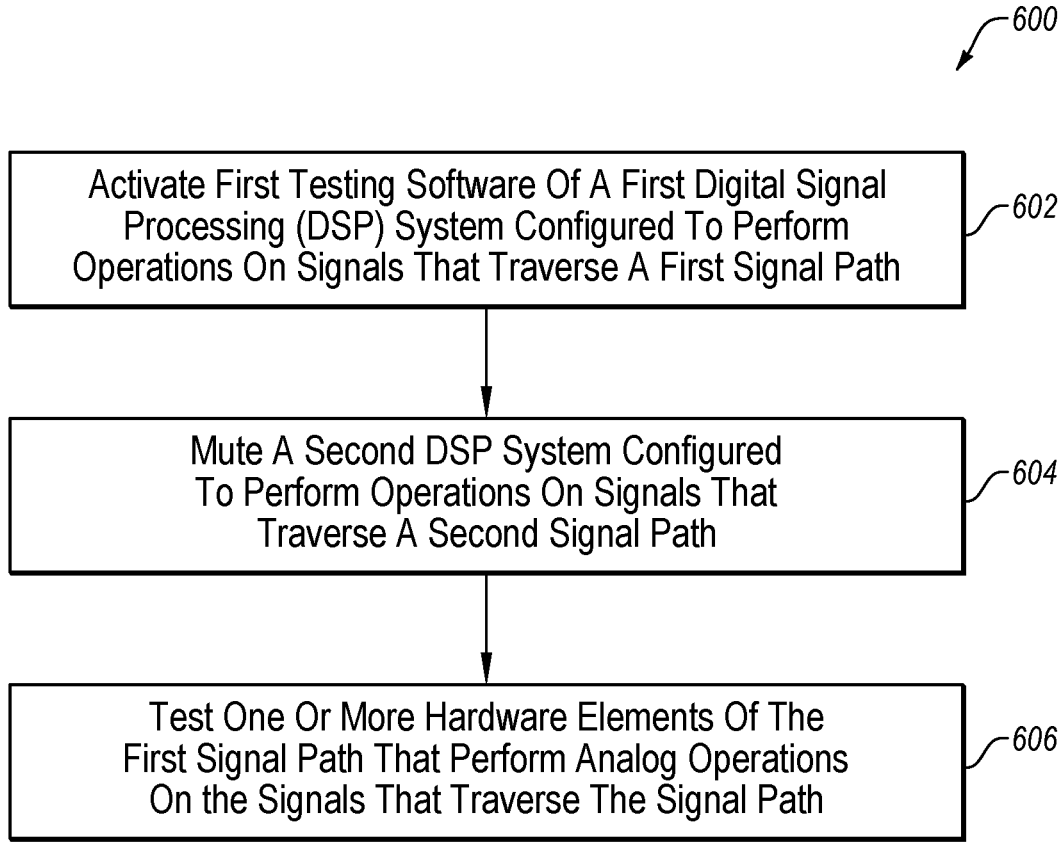
FIG. 6 is a flowchart of an example method to perform testing of a system that may include multiple signal paths.

FIG. 6 is a flowchart of an example method 600 to perform testing of a system that may include multiple signal paths. The method 600 may be arranged in accordance with at least one embodiment described in the present disclosure. The method 600 may be implemented, in some embodiments, by the system 100, the communication device 200, or the system 300 of FIGS. 1, 2, and 3. In some embodiments, the method 600 may result from operations performed by a system based on instructions stored in one or more computer-readable media. Although illustrated as discrete blocks, various blocks may be divided into additional blocks, combined into fewer blocks, or eliminated, depending on the particular implementation.

The method 600 may begin at block 602 where first testing software of a first DSP system may be activated. In some embodiments, the first testing software may be activated instead of first operating software of the first DSP system. The first DSP system may be configured to perform operations on signals that traverse a first signal path. In some embodiments, the first testing software may be similar or analogous to the testing software described above with respect to FIG. 1 and the first operating software may be similar or analogous to the operating software described above with respect to FIG. 1. Additionally or alternatively, the first testing software may be activated instead of the first operating software in a similar or analogous manner described above with respect to FIG. 1.

At block 604, a second DSP system may be muted. The second DSP may be configured to perform operations with respect to signals that traverse a second signal path. The muting may null signals that traverse the second signal path. In some embodiments, the second DSP system may be muted by activating muting software of the second DSP system.

At block 606, one or more elements of the first signal path may be tested while the first testing software is activated and while the second DSP system is muted. In some embodiments, the one or more elements may include one or more hardware elements that may be configured to perform analog operations on signals that traverse the first signal path.

Modifications, additions, or omissions may be made to method 600 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may include operations related to activating the first operating software of the first DSP system instead of the first testing software. In some embodiments, the first operating software may be activated in response to the testing of the one or more elements of the first signal path finishing. Additionally or alternatively, the first operating software may be activated in response to a determination being made that the testing has finished. In some embodiments, the determination may be made as described above with respect to FIG. 1. In these or other embodiments, the first operating software may be activated in preparation for shipping or use of a system that includes the first signal path. In these or other embodiments, the operations of blocks Additionally or alternatively, in some embodiments, operations similar or analogous to those described above with respect to testing one or more elements of the second signal path while muting the first DSP system.

As indicated above, the embodiments described in the present disclosure may include the use of a special purpose or general purpose computer (e.g., the processor 450 of FIG. 4) including various computer hardware or software modules, as discussed in greater detail below. Further, as indicated above, embodiments described in the present disclosure may be implemented using computer-readable media (e.g., the memory 452 or data storage 454 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of testing hardware, the method comprising:
activating, by a control system during testing of one or more analog hardware elements included in a signal path of an electronic device, testing software of a digital signal processing system that is included in the signal path of the electronic device, the testing software being configured to cause the digital signal processing system to perform linear operations with respect to signals that traverse the signal path;
deactivating, by the control system during the testing of the one or more analog hardware elements, operating software of the digital signal processing system, the operating software being configured to cause the digital signal processing system to perform non-linear operations with respect to signals that traverse the signal path; and
activating, by the control system, the operating software and deactivating the testing software in response to the testing of the one or more analog hardware elements finishing.

2. The method of claim 1, wherein activating the testing software and deactivating the operating software includes replacing the operating software with the testing software.

3. The method of claim 1, wherein activating the testing software and deactivating the operating software includes configuring the digital signal processing system such that the testing software performs operations with respect to signals that traverse the signal path and such that the operating software does not perform operations with respect to signals that traverse the signal path.

4. The method of claim 1, wherein activating the testing software and deactivating the operating software includes loading the testing software instead of loading the operating software.

5. The method of claim 1, wherein the signal path is a first signal path and wherein the method further comprises muting a second signal path during the testing of the one or more analog hardware elements.

6. The method of claim 5, wherein muting the second signal path includes activating muting software that nulls signals that traverse the second signal path.

7. The method of claim 5, wherein the first signal path is a communication session receive signal path and the second signal path is a communication session transmit signal path.

8. The method of claim 5, wherein the first signal path is a communication session transmit signal path and the second signal path is a communication session receive signal path.

9. A method of testing hardware of a system that performs digital signal processing, the method comprising:
activating, by a control system during testing of one or more first analog hardware elements included in a first signal path of an electronic device, first linear testing software of a first digital signal processing system included in the first signal path;
deactivating, by the control system during the testing of the one or more first analog hardware elements, first non-linear operating software of the first digital signal processing system; and
muting, by the control system during the testing of the one or more first analog hardware elements, a second digital signal processing system included in a second signal path of the electronic device, the muting nulls signals that traverse the second signal path and the second digital signal processing system being configured to perform operations with respect to signals that traverse the second signal path.

10. The method of claim 9, further comprising activating the first non-linear operating software and deactivating the first linear testing software in response to the testing of the one or more first analog hardware elements finishing.

11. The method of claim 9, further comprising, in response to the testing of the one or more first analog hardware elements finishing:
   activating, by the control system during testing of one or more second analog hardware elements included in the second signal path, second linear testing software of the second digital signal processing system;
   deactivating, by the control system during the testing of the one or more second analog hardware elements, second non-linear operating software of the second digital signal processing system; and
   muting, by the control system during the testing of the one or more second analog hardware elements, the first digital signal processing system, the muting nulls signals that traverse the first signal path.

12. The method of claim 11, wherein the first linear testing software and the second linear testing software are the same code.

13. The method of claim 11, wherein the first non-linear operating software and the second non-linear operating software are the same code.

14. The method of claim 9, wherein the first digital signal processing system and the second digital signal processing system are a same digital signal processing system configured to perform digital signal processing with respect to signals that traverse the first signal path and the second signal path.

15. The method of claim 9, wherein muting the second digital signal processing system includes activating muting software in the second digital signal processing system that nulls signals that traverse the second signal path.

16. A system comprising:
   a signal path;
   one or more analog hardware elements included in the signal path;
   a digital signal processing system included in the signal path;
   one or more non-transitory computer-readable media configured to store one or more instructions; and
   one or more processors communicatively coupled to the one or more computer-readable media and configured to, in response to executing the one or more instructions, cause performance of operations comprising:
   activating, during testing of the one or more analog hardware elements, linear testing software of the digital signal processing system; and
   deactivating, during the testing of the one or more analog hardware elements, non-linear operating software of the digital signal processing system.

17. The system of claim 16, wherein the operations further comprise:
   determining that the testing of the one or more analog hardware elements with the linear testing software activated has finished; and
   activating the non-linear operating software and deactivating the linear testing software in response to determining that the testing of the one or more analog hardware elements has finished.

18. The system of claim 16, wherein the operations further comprise activating the non-linear operating software and deactivating the linear testing software in response to the testing of the one or more analog hardware elements having finished.

19. The system of claim 16, wherein the digital signal processing system includes the one or more non-transitory computer-readable media and the one or more processors.

20. The system of claim 16, wherein the signal path is a first signal path, the system includes a second signal path, and the operations further comprise muting the second signal path during the testing of the one or more analog hardware elements.

* * * * *